United States Patent [19]

Bang

[11] Patent Number: 5,367,342
[45] Date of Patent: Nov. 22, 1994

[54] ADAPTIVE Y/C SEPERATION WITH ARTIFACTS REMOVAL VIA SWITCHABLE TRAP IN LUMINANCE CHANNEL

[75] Inventor: Joon W. Bang, Seoul, Rep. of Korea

[73] Assignee: Gold Star Co., Ltd., Seoul, Rep. of Korea

[21] Appl. No.: 866,213

[22] Filed: Apr. 9, 1992

[30] Foreign Application Priority Data

Apr. 9, 1991 [KR] Rep. of Korea ............ 4809/1991[U]

[51] Int. Cl.$^5$ ................................................ H04N 9/78
[52] U.S. Cl. ..................................... 348/667; 348/666
[58] Field of Search ................... 358/31; 348/663, 665, 348/666, 667; H04N 9/64, 9/77, 9/78

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,179,705 | 12/1979 | Faroudja | 358/31 |
| 4,205,335 | 5/1980 | Nakagawa et al. | 358/31 |
| 4,240,105 | 12/1980 | Faroudja | 358/31 |
| 4,707,732 | 11/1987 | Matono et al. | 358/31 |
| 4,845,547 | 7/1989 | Naimpally | 358/31 |
| 4,994,906 | 2/1991 | Moriwake | 358/31 |
| 5,005,074 | 4/1991 | Perlman | 358/31 |
| 5,019,895 | 5/1991 | Yamamoto et al. | 358/31 |
| 5,063,438 | 11/1991 | Faroudja | 358/31 |

OTHER PUBLICATIONS

Hanging Dot Reducer For NTSC 1H Comb Filter, RCA Enginnering Laboratories, Ltd., Jan. 1990, S. Shiratsuchi.

Primary Examiner—Mark R. Powell
Assistant Examiner—John W. Miller

[57] ABSTRACT

An apparatus for separating a luminance signal and a chrominance signal from a video signal includes a subtractor for obtaining a difference (first subtract signal) between the original composite video signal and a one line-delayed video signal and a difference (second subtract signal) between the one line-delayed video signal and a two line-delayed video signal, an adder for adding the first subtract signal to the second subtract signal, a line correlation detector for detecting a correlation between adjacent horizontal scanning lines, and a multiplexer for selecting one of the first subtract signal, the second subtract signal, an add signal from the adder, and an output signal from a band pass filter which band pass-filters the one line-delayed video signal, in response to an output signal from the line correlation detector whereby the apparatus provides improved resolution, thereby assuring excellent picture quality.

5 Claims, 3 Drawing Sheets

ADAPTIVE Y/C SEPERATION WITH ARTIFACTS REMOVAL VIA SWITCHABLE TRAP IN LUMINANCE CHANNEL

BACKGROUND OF THE INVENTION

1. Field of the Invention

The present invention relates to an apparatus for separating luminance and chrominance components from a video signal and more particularly, to an apparatus for separating a luminance signal and a chrominance signal from a composite video signal in a television set (hereinafter "TV") or a video cassette recorder (hereinafter "VCR") utilizing a correlation between adjacent horizontal scanning lines.

2. Description of the Prior Art

Various types of apparatus for separating luminance and chrominance components from a video signals are known in the art.

Referring to FIG. 1, there is shown an example of conventional apparatuses for separating luminance and chrominance signals from a composite video signal in block form. Such illustrated conventional apparatus comprises a line delay 10 for delaying a composite video signal by one horizontal scanning line, a first subtracter 11 for obtaining a signal difference between adjacent horizontal scanning lines, or between one scanning line and the next scanning line, a band pass filter 12 for band pass-filtering an output signal from the subtracter 11 so as to output a chrominance signal C, a low pass filter 13 for low pass-filtering an output signal from the subtracter 11, and an absolute converter 14 for taking an absolute value of an output signal from the low pass filter 13. The illustrated prior art apparatus further comprises a hanging dot detector 15 for detecting hanging dots of steplike shape which may occur between adjacent horizontal scanning lines, a first delay 16 for delaying the composite video signal by a predetermined period of time, a second subtracter 17 for obtaining a difference between an output signal from the band pass filter 12 and an output signal from the first delay 16, a second delay 16a for delaying an output signal from the subtracter 17 by a predetermined period of time, a band reject filter 18 for rejecting a desired frequency band of the output signal from the subtracter 17, and a switch SW10 for selecting one of an output signal from the second delay 16a and an output signal from the band reject filter 18 in response to an output signal from the hanging dot detector 15, to output a luminance signal Y.

The conventional apparatus having the above-mentioned construction operates as follows.

First, the input composite video signal is delayed by one horizontal scanning line by the line delay 10. The subtracter 12 obtains a signal difference between the compositive video signal and the one line-delayed video signal from the line delay 10. Then, the output signal from the subtracter 11 is applied to the low pass filter 13 and the band pass filter 12 which band pass-filters the output signal from the subtracter 11 to output the chrominance signal C. The low frequency component from the low pass filter 13 is inputted to the absolute converter 14. At this time, if there is low correlation between adjacent horizontal scanning lines, the absolute converter 14 outputs a higher absolute value signal which causes a cross luminance signal and a cross chrominance signal to appear on a picture screen, thereby resulting in degradation of a picture quality. The cross luminance signal means the luminance signal Y which remains in the chrominance signal domain due to an erroneous separation when the composite video signal is separated into chrominance and luminance signals. On the contrary, the cross chrominance signal signifies a chrominance signal which remains in the luminance signal domain due to an erroneous separation when the composite video signal is separated into chrominance and luminance signals.

In order to solve such picture quality degradation problem caused by the higher absolute value signal from the absolute converter 14, the hanging dot detector 15 has been provided in the apparatus. The hanging dot detector 15 outputs a control signal to a switch SW10 in order to select, as the luminance signal Y, the output signal from the second delay 16a or the output signal from the band reject filter 18. If the hanging dot detector 15 outputs a high signal as the control signal to the switch SW10, then as the luminance signal Y through the switch SW10 is outputted the output signal from the band reject filter 18 which rejects a chrominance sub-carrier frequency band of the output signal from the subtracter 17. On the other hand, if the hanging dot detector 15 outputs a low signal, then as the luminance signal Y through the switch SW10 is outputted the output signal from the second delay 16a which delays the output signal from the subtracter 17 by a predetermined period of time.

However, the above-mentioned conventional apparatus suffers from a number of disadvantages, for example, low correlation between adjacent horizontal scanning lines causes a loss of high frequency horizontal component on the picture screen, resulting in degradation in a horizontal resolution.

Another chrominance and luminance separating techniques are disclosed in U.S. Pat. No. 4,240,105 to Yves C. Faroudja, entitled "Method and apparatus for separation of chrominance and luminance with adaptive comb filtering in a quadrature modulated color television system" and a report entitled "Hanging dot reducer for NTSC 1H comb filter", published Jan. 1990, RCA Engineering Laboratories, Ltd. However, these techniques do not provide a significant improvement in the resolution, either.

SUMMARY OF THE INVENTION

Accordingly, it is an object of the present invention to provide an apparatus for separating a luminance signal and a chrominance signal from a video signal utilizing a correlation between adjacent horizontal scanning lines in order to provide an improved resolution, which eliminates the above problems encountering with the conventional apparatus for separating a luminance signal and a chrominance signal from video.

The present invention provides an apparatus for separating a chrominance signal and a luminance signal from a video signal, comprising: line delaying means for delaying a composite video signal by one and two horizontal scanning lines; first subtracting means for obtaining a difference (first subtract signal) between the original composite video signal and a one line-delayed video signal from the line delaying means and a difference (second subtract signal) between the one line-delayed video signal and a two line-delayed video signal from the line delaying means; adding means for adding the first subtract signal to the second subtract signal; first filtering means for band pass-filtering the one line-delayed video signal from the line delaying means; line correlation detecting means for detecting a correlation between adjacent horizontal scanning lines; selecting means for selecting one of the first subtract signal, the second subtract signal, an add signal or an output signal from the adding means and an output signal from the first filtering means in response to an output signal from the line correlation detecting means; hanging dot detecting means for detecting hanging dots from an output signal from the selecting means; second filtering means for band pass-filtering the output signal from the selecting means to output a chrominance signal; first delay means for delaying the composite video signal by a predetermined period of time; second subtracting means for obtaining a difference (third subtract signal) between a time delayed video signal from the first delay means and the chrominance signal from the second filtering means; second delay means for delaying the third subtract signal from the second subtracting means by a predetermined period of time; third filtering means for rejecting a vertical frequency band of the third subtract signal from the second subtracting means; and switching means for selecting one of an output signal from the second delay means and an output signal from the third filtering means in response to an output signal from the hanging dot detecting means, to output a luminance signal.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an apparatus for separating a luminance signal and a chrominance signal from a video signal including a subtracter for obtaining a difference (first subtract signal) between the original composite video signal and a one line-delayed video signal and a difference (second subtract signal) between the one line-delayed video signal and a two line-delayed video signal, an adder for adding the first subtract signal to the second subtract signal, a line correlation detector for detecting a correlation between adjacent horizontal scanning lines, and a multiplexer for selecting one of the first subtract signal, the second subtract signal, an add signal or an output signal from the adder and an output signal from a band pass filter which band pass-filters the one line-delayed video signal, in response to an output signal from the line correlation detector whereby the apparatus can provide an improved resolution, thereby assuring excellency in a picture quality.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
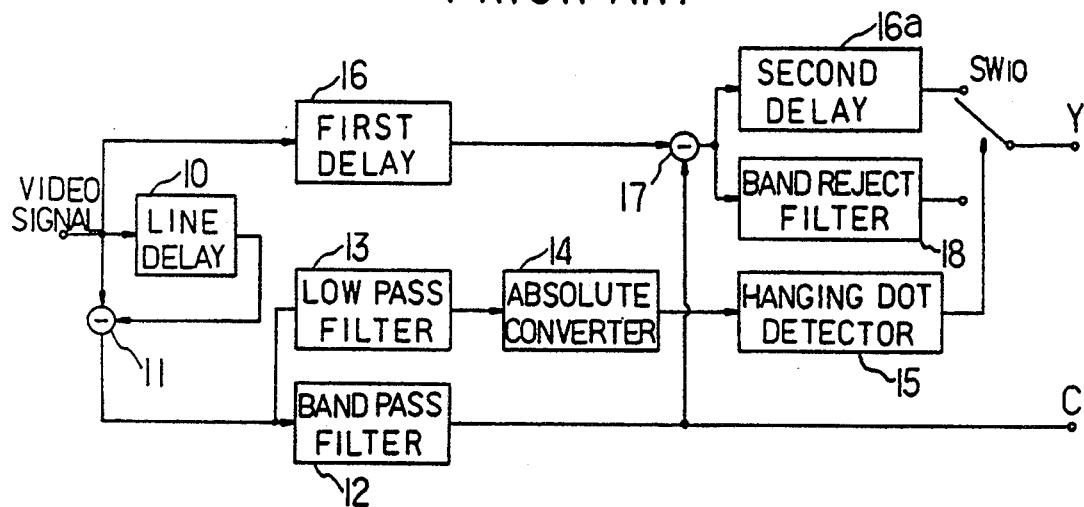
FIG. 1 is a block diagram of a conventional apparatus for separating a luminance signal and a chrominance signal from a video signal.
Figure 2:
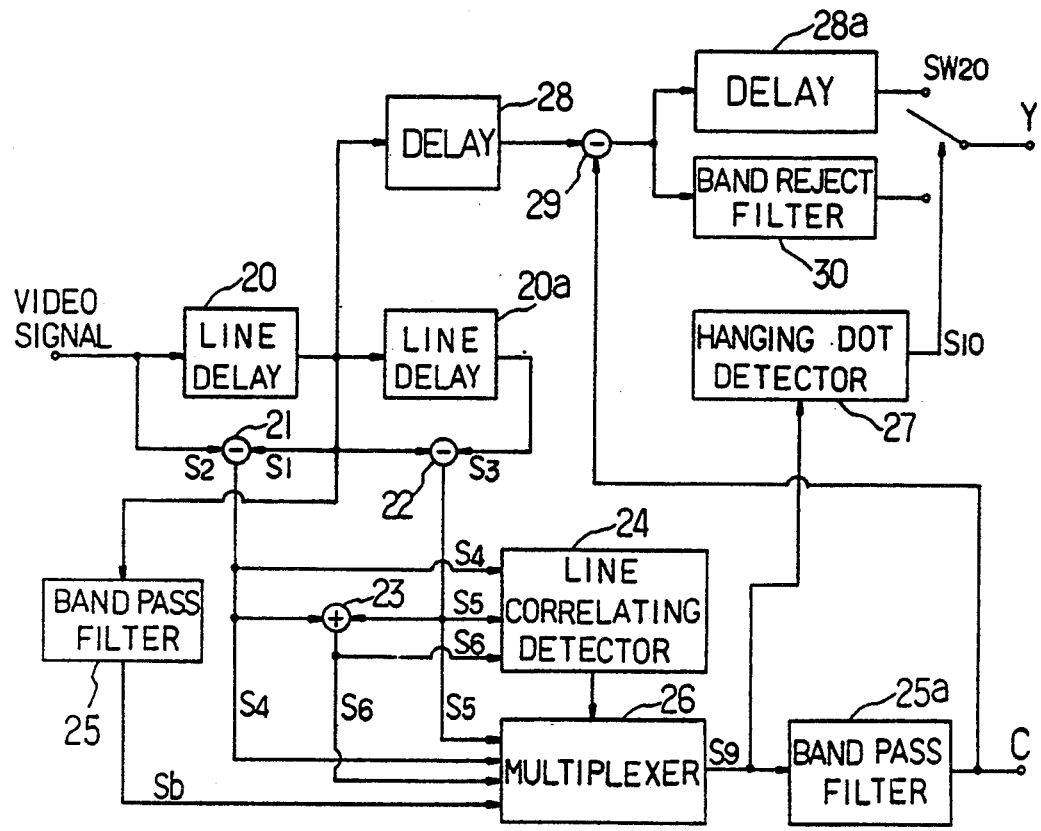
FIG. 2 is a block diagram of the apparatus for separating a luminance signal and a chrominance signal from a video signal in accordance with the present invention.

Referring now in detail to the drawings for the purpose of illustrating preferred embodiments of the present invention, the apparatus for separating a luminance signal and a chrominance signal from a video signal as shown in FIG. 2, comprises a first line delay 20 for delaying a composite video signal by one horizontal scanning line, a second line delay 20a for delaying a one line-delayed video signal from the line delay 20 by one horizontal scanning line, a first subtracter 21 for obtaining a difference (first subtract signal) between the original composite video signal and the one line-delayed video signal from the line delay 20, and a second subtracter 22 for obtaining a difference (second subtract signal) between the one line-delayed video signal from the line delay 20 and a two line-delayed video signal from the second line delay 20a. The apparatus according to the present invention further comprises an adder 23 for adding the first subtract signal from the first subtracter 21 to the second subtract signal from the second subtracter 22, a line correlation detector 24 for detecting a correlation between adjacent horizontal scanning lines, a first band pass filter 25 for band pass-filtering the one line-delayed video signal from the first line delay 20, a multiplexer 26 for selecting one of the first subtract signal from the first subtracter 21, the second subtract signal from the second subtracter 22, an add signal or an output signal from the adder 23 and an output signal from the first band pass filter 25 in response to an output signal from the line correlation detector 24, and a hanging dot detector 27 for detecting hanging dots from an output signal from the multiplexer 26, a second band pass filter 25a for band pass-filtering the output signal from the multiplexer 26 to output a chrominance signal C. Furthermore, the apparatus according to the present invention comprises a first delay 28 for delaying the composite video signal by a predetermined period of time, a third subtracter 29 for obtaining a difference (third subtract signal) between an output signal from the second band pass filter 25a and an output signal from the first delay 28, a second delay 28a for delaying the third subtract signal from the third subtracter 29 by a predetermined period of time, a band reject filter 30 for rejecting a desired frequency band of the third subtract signal from the third subtracter 29, and a switch SW20 for selecting one of an output signal from the second delay 28a and an output signal from the band reject filter 30 in response to an output signal from the hanging dot detector 27, to output a luminance signal Y.

Figure 3:
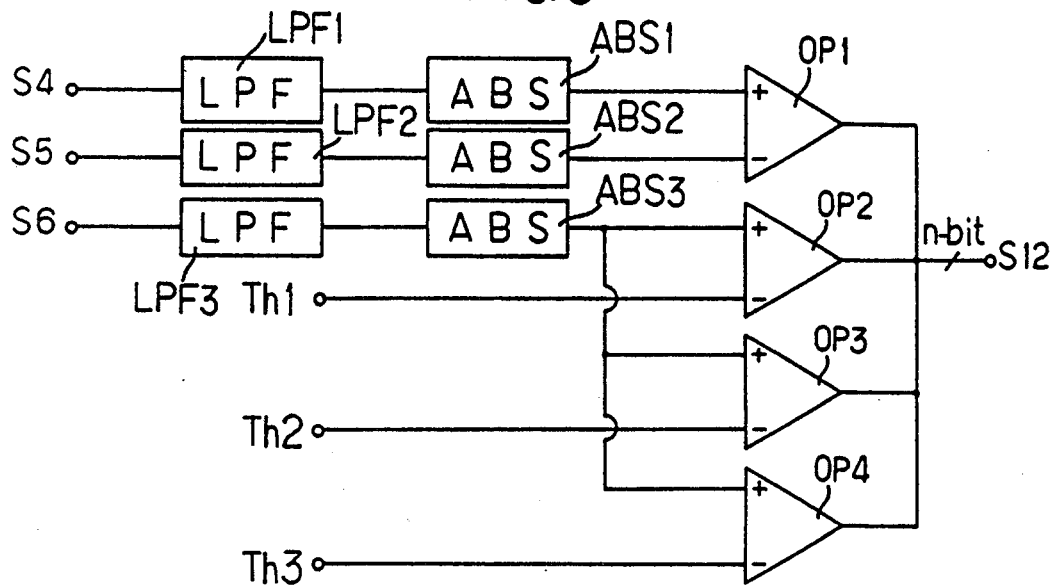
FIG. 3 is a block diagram of a line correlation detector in FIG. 2 in accordance with a first embodiment of the present invention.

Referring to FIG. 3, there is shown a block diagram of the line correlation detector 24 in FIG. 2 in accordance with an embodiment of the present invention. As shown in FIG. 3, the line correlation detector 24 is provided with a plurality of low pass filters LPF1-LPF3 for low pass-filtering the first subtract signal from the first subtracter 21, the second subtract signal from the second subtracter 22 and the add signal from the adder 23 respectively, and a plurality of absolute converters ABS1-ABS3 for taking absolute values of output signals from the corresponding lower pass filters LPF1-LPF3, respectively. The line correlation detector 24 further includes a first comparator OP1 for comparing an output signal from the absolute converter ABS1 and an output signal from the absolute converter ABS2, a second comparator OP2 for comparing an output signal from the absolute converter ABS3 and a reference threshold voltage TH1, a third comparator OP3 for comparing the output signal from the absolute converter ABS3 and a reference threshold voltage Th2, and a fourth comparator OP4 for comparing the output signal from the absolute converter ABS3 and a reference threshold voltage Th3. Herein, the threshold voltages have a relationship of Th1<Th2<Th3.

Figure 4:
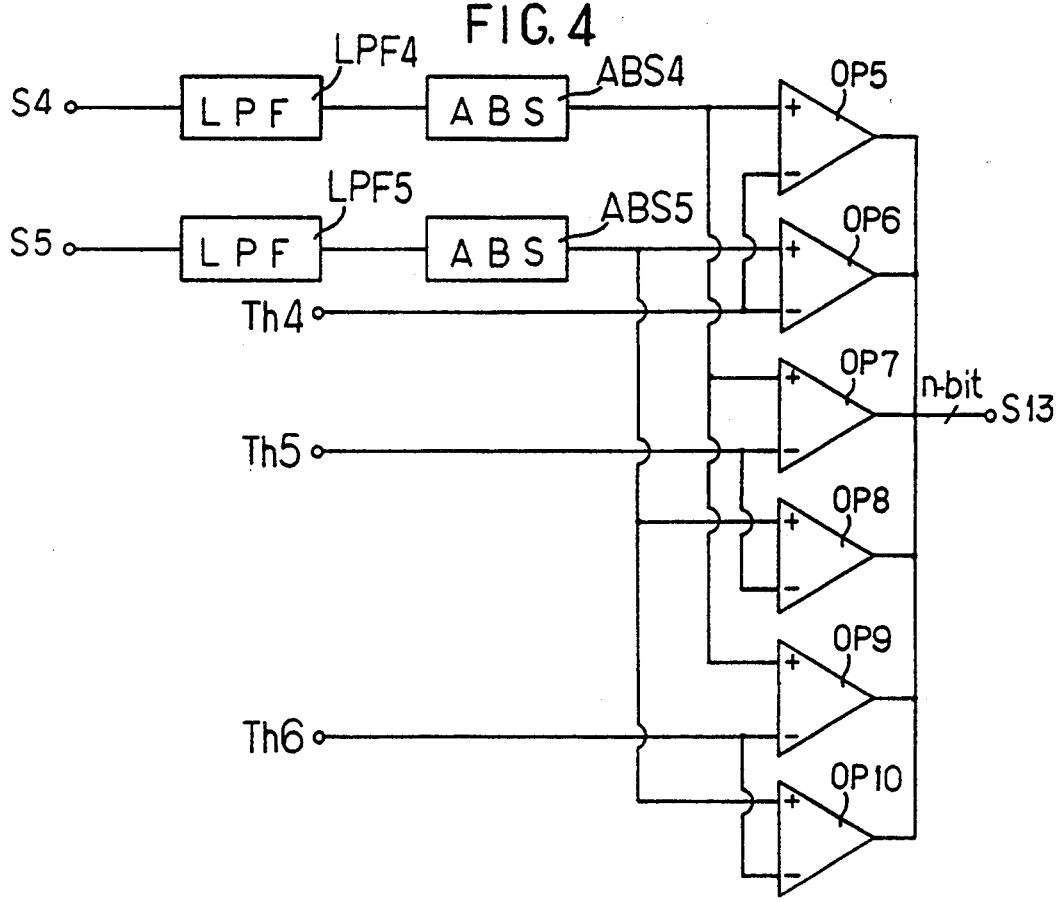
FIG. 4 is a block diagram of the line correlation detector in FIG. 2 in accordance with an alternative embodiment of the present invention.

Referring to FIG. 4, there is shown a block diagram of the line correlation detector 24 in FIG. 2 in accordance with an alternative embodiment of the present invention. As shown in FIG. 4, the line correlation detector 24 is provided with a pair of low pass filters LPF4 and LPF5 for low pass-filtering the first subtract signal from the first subtracter 21 and the second subtract signal from the second subtracter 22 respectively, a pair of absolute converters ABS4 and ABS5 for taking absolute values of output signals from the corresponding low pass filters LPF4 and LPF5 respectively, and a fifth to tenth comparators OP5-OP10 for comparing corresponding output signals from the absolute converters ABS4 and ABS5 and corresponding reference threshold voltages Th4-Th6 respectively. Herein, the threshold voltages have a relationship of Th4<Th5<Th6.

Figure 5:
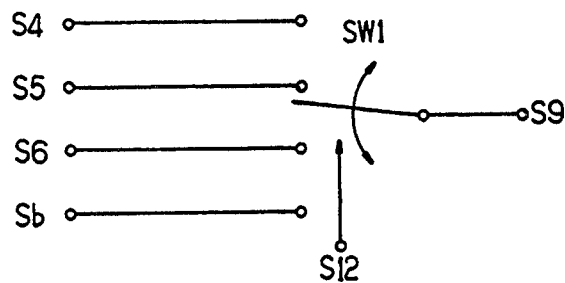
FIG. 5 shows a construction of a multiplexer in FIG. 2 in accordance with the first embodiment of the present invention.

Referring to FIG. 5, there is shown a construction of the multiplexer 26 in FIG. 2 in accordance with the first embodiment of the present invention. As shown in FIG. 5, the multiplexer 26 is provided with a switch SW1 for selectively outputting one of the signals inputted therein in response to the output signal from the line correlation detector 24 in FIG. 3.

Figure 6:
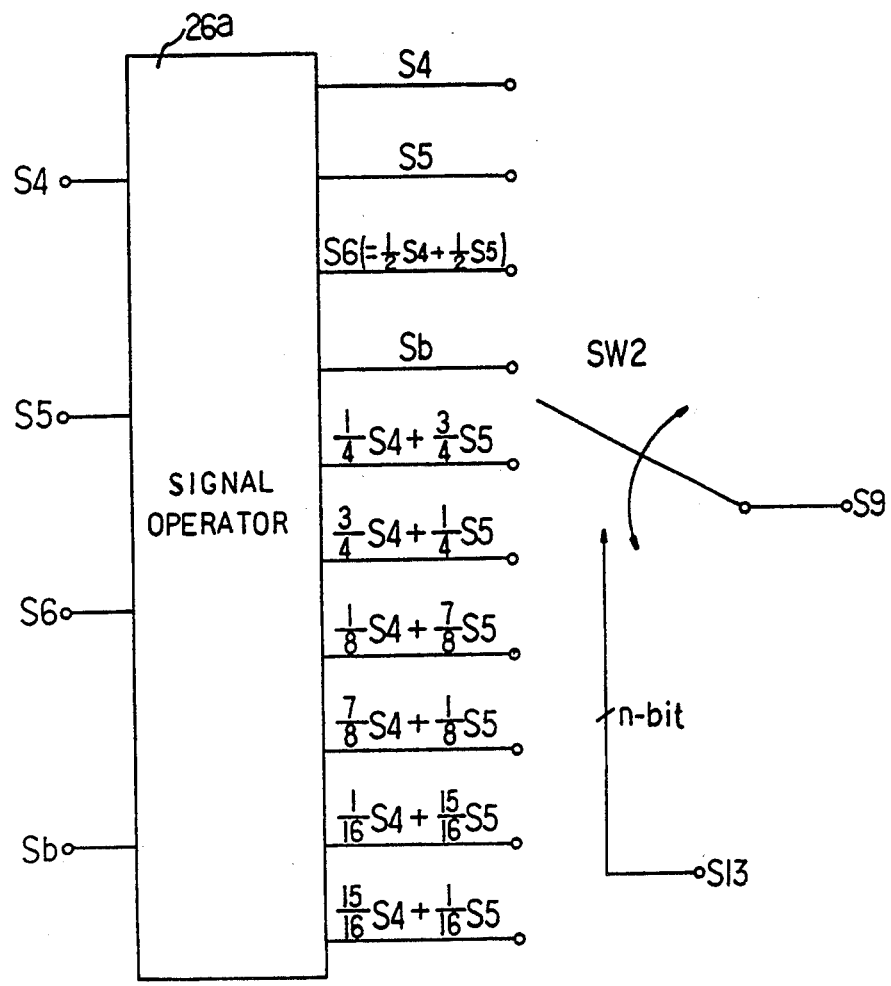
FIG. 6 shows another construction of the multiplexer in FIG. 2 in accordance with the alternative embodiment of the present invention.

Referring to FIG. 6, there is shown another construction of the multiplexer 26 in FIG. 2 in accordance with the alternative embodiment of the present invention. As shown in FIG. 6, the multiplexer 26 includes a signal operator 26a for operating the signals inputted therein and a switch SW2 for selectively outputting one of output signals from the signal operator 26a in response to the output signal from the line correlation detector 24 in FIG. 4.

Figure 7:
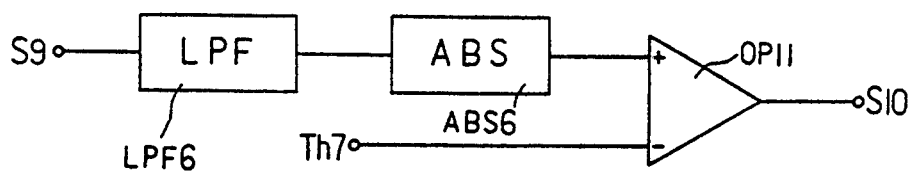
FIG. 7 is a block diagram of a hanging dot detector in FIG. 2 in accordance with the present invention.

Referring to FIG. 7, there is shown a block diagram of the hanging dot detector 27 in FIG. 2 in accordance with the present invention. As shown in FIG. 7, the hanging dot detector 27 includes a low pass filter LPF6 for low pass-filtering the output signal from the multiplexer 26, an absolute converter ABS6 for taking an absolute value of an output signal from the low pass filter LPF6 and a comparator OP11 for comparing an output signal from the absolute converter ABS6 and a reference threshold voltage Th7. Also, Table 1 illustrates an example of the output signal from the multiplexer 26 in conjunction with FIGS. 5 and 6.

TABLE 1

| NO | S4 | S5 | S6 |
|---|---|---|---|
| 1 | 0 | 1 | 0 |
| 2 | 1 | 0 | 0 |
| 3 | $\frac{1}{2}$ | $\frac{1}{2}$ | 0 |
| 4 | $\frac{1}{4}$ | $\frac{3}{4}$ | 0 |
| 5 | $\frac{3}{4}$ | $\frac{1}{4}$ | 0 |
| 6 | $\frac{1}{8}$ | $\frac{7}{8}$ | 0 |
| 7 | $\frac{7}{8}$ | $\frac{1}{8}$ | 0 |
| 8 | $\frac{1}{16}$ | $\frac{15}{16}$ | 0 |
| 9 | $\frac{15}{16}$ | $\frac{1}{16}$ | 0 |
| 10 | X | X | 1 |

Now, the apparatus with the above-mentioned construction in accordance with the present invention operates as follows.

First, the input composite video signal S2 is delayed by one horizontal scanning line by the first line delay 20 which outputs the one line-delayed video signal S1 to the second line delay 20a. Also, the second line delay 20a delays the one line-delayed video signal S1 from the first delay 20 by one horizontal scanning line and, thus, outputs the two line-delayed video signal S3. Then a difference between the one line-delayed video signal S1 and the original video signal S2 is calculated by the first subtracter 21 which then outputs the first subtract signal S4. The second subtracter 22 calculates a difference between the one line-delayed video signal S1 and the two line-delayed video signal S3 and outputs the calculated difference as the second subtract signal S5. The subtract signals S4 and S5 are added into the add signal S6 by the adder 23, which is applied to the line correlation detector 24 and the multiplexer 26, together with the subtract signals S4 and S5. Also, the one line-delayed video signal S1 from the first line delay 20 is inputted to the first band pass filter 25 which ten band pass-filters the input signal S1 and outputs the band pass-filtered video signal Sb to the multiplexer 26.

Upon application of the signals S4, S5 and S6 to the line correlation detector 24 in FIG. 3, the signals S4, S5 and S6 are passed through the low pass filters LPF1-LPF3 and then through the absolute converters ABS1-ABS3. The outputs of the absolute converters ABS1-ABS3 are absolute value data of the low frequency components of the line difference chrominance components. The lower absolute value causes the line correlation to be higher, which represents an preferred separation of the chrominance and luminance signal components, while the higher absolute value causes the line correlation to be lower, which represents an imperfect separation of the chrominance and luminance signal components. On the other hand, the output signals from the absolute converters ABS1 and ABS2 are applied to the comparator OP1 for comparison with respect to each other. Also, the output signal from the absolute converter ABS3 is applied to the comparators OP2, OP3 and OP4 for comparison with respective reference threshold voltages TH1, TH2 and Th3.

A high output from the comparator OP1 signifies that the correlation between the one line-delayed video signal S1 and the two line-delayed video signal S3 is better than that between the one-delayed video signal S1 and the original video signal S2. Also, if the output signal from the absolute converter ABS3 at the non-inverting input terminals of the comparators OP2–OP4 is higher than the threshold voltages Th2–Th4 at the inverting input terminal thereof, the comparators OP-2–OP4 output high signals, respectively. These high outputs from the comparators OP2–OP4 signifies that the correlation between the signals S1 and S2 and the correlation between the signals S1 and S3 are in some degree lower, thereby resulting in an imperfect separation of the chrominance and luminance signal components.

The outputs of the comparators OP1–OP4 form an n-bit output S12 of the line correlation detector 24 which is applied as a control signal to the multiplexer 26 in FIG. 5. In response to the output signal S12 from the line correlation detector 24, the multiplexer 26 selectively outputs one of the first subtract signal S4 from the first subtracter 21, the second subtract signal S5 from the second subtracter 22, the add signal S6 from the adder 23 and the output signal Sb from the first band pass filter 25 to the hanging dot detector 27 in FIG. 7.

In hanging dot detector 27, the output signal S9 from the multiplexer 26 is passed through the low pass filter LPF6 and then through the absolute converter ABS6 to the non-inverting input terminal of the comparator OP11, the inverting input terminal of which inputs the reference threshold voltage Th7. If the output signal S9 from the multiplexer 26 is higher in level than the threshold voltage Th7, the comparator OP11 outputs the signal S10 of high level which represents that the chrominance component through the multiplexer 26 contains relatively more low frequency components, thereby causing an imperfect separation of the chrominance and luminance signal components, resulting in degradation of a picture quality.

Also, the output signal S9 from the multiplexer 26 is band pass-filtered by the second band pass filter 25a which then outputs the band pass-filtered signal as the chrominance signal C. Then, the chrominance signal C from the second band pass filter 25a is applied to the third subtracter 29 which then calculates a difference (third subtract signal) between the input chrominance signal C and the time delayed video signal from the first delay 28.

As a result, if the hanging dot detector 27 outputs the signal S10 of high level as a control signal to the switch SW20, then as the luminance signal Y through the switch SW20 is outputted the output signal from the band reject filter 30 which rejects a vertical frequency band of the third subtract signal from the third subtracter 29. On the other hand, if the hanging dot detector 27 outputs the signal S10 of low level which represents an preferred separation of the chrominance and luminance signal components, then as the luminance signal Y through the switch SW20 is outputted, the output signal from the second delay 28a delays the third subtract signal from the third subtracter 29 by a predetermined period of time. As a result, the output signal S10 from the hanging dot detector 27 functions as a control signal to output, as the luminance signal Y, the output signal from the second delay 28a or the output signal from the band reject filter 30.

FIGS. 4 and 6 illustrate other constructions of the line correlation detector 24 and the multiplexer 26 in FIG. 2 in accordance with the alternative embodiment of the present invention, respectively. In FIG. 4, upon application of the signals S4 and S5 to the line correlation detector 24, the signals S4 and S5 are passed through the low pass filters LPF4 and LPF5 and then through the absolute converters ABS4 and ABS5. Then, the output signal from the absolute converter ABS4 is applied to the comparators OP5, OP7 and OP9 for comparison with respective reference threshold voltages Th4, Th5 and Th6, while the output signal from the absolute converter ABS5 is applied to the comparators OP6, OP8 and OP10 for comparison with the respective reference threshold voltages Th4, Th5 and Th6. The outputs of the comparators OP5–OP10 form an n-bit output S13 of the line correlation detector 24 which is applied as a control signal to the multiplexer 26 in FIG. 6.

Only two input signals S4 and S5 are required as input to the line correlation detector 24 in FIG. 4. On the other hand, the multiplexer 26 in FIG. 6 inputs the first subtract signal S4 from the subtracter 21, the second subtract signal S5 from the second subtracter 22, the add signal S6 from the adder 23 and the output signal Sb from the first band pass filter 25 and combines the input signals S4, S5, S6 and Sb as in Table 1, in order to selectively output an adaptive signal of the combined signals, as the output signal S9 to the hanging dot detector 27 in FIG. 7, in response to the output signal S13 from the line correlation detector 24.

As hereinbefore described, according to the present invention, there is provided apparatus for separating the luminance signal and the chrominance signal from the video signal utilizing a correlation between adjacent horizontal scanning lines. Therefore, the apparatus of the present invention can provide an improved resolution, thereby assuring excellency in a picture quality.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for separating a chrominance signal and a luminance signal from a composite video signal, comprising:

line delaying means for delaying the composite video signal by one and two horizontal scanning lines, first subtracting means for subtracting the original composite video signal and a one line-delayed video signal from said line delaying means to produce a first subtract signal and for subtracting the one line-delayed video signal and a two line-delayed video signal from said line delaying means to produce a second subtract signal, adding means for adding said first subtract signal to said second subtract signal to produce an add signal, first filtering means for band pass-filtering the one line-delayed video signal from said line delaying means to produce a filtered one line-delayed video signal, line correlation detecting means for receiving said first subtract signal, said second subtract signal, and said add signal and detecting a correlation between adjacent horizontal scanning lines of said video signal to produce an n-bit comparison signal, selecting means for selecting one of said first subtract signal, said second subtract signal, said add signal and said filtered one line delayed video signal, in response to said n-bit comparison signal from said line correlation detecting means as an output signal, hanging dot detecting means for detecting hanging dots from said output signal from said selecting means to produce a hanging dot signal, second filtering means for band pass-filtering said output signal from said selecting means to output said chrominance signal, first delay means for delaying the composite video signal by a predetermined period of time to produce a time delayed video signal, second subtracting means for subtracting said time delayed video signal from said first delay means and said chrominance signal from said second filtering means to produce a third subtract signal, second delay means for delaying said third subtract signal from said second subtracting means by the predetermined period of time to produce a delayed third subtract signal, third filtering means for rejecting a vertical frequency band of said third subtract signal from said second subtracting means to produce a filtered third subtract signal, and switching means for selecting one of said delayed third subtract signal from said second delay means and said filtered third subtract signal from said third filtering means in response to said hanging dot signal from said hanging dot detecting means, to output said luminance signal.

2. The apparatus of claim 1, wherein said line correlation detecting means includes:

first to third low pass filters for low pass-filtering said first subtract signal a, said second subtract signal and said add signal, respectively, first to third absolute converters for determining absolute values of output signals from said corresponding low pass filters respectively, a first comparator for comparing an output signal from said first absolute converter and an output signal from said second absolute converter, a second comparator for comparing an output signal from said third absolute converter and a first reference threshold voltage, a third comparator for comparing the output signal from said third absolute converter and a second reference threshold voltage, and a fourth comparator for comparing the output signal from said third absolute converter and a third reference threshold voltage.

3. The apparatus of claim 2, wherein said selecting means includes:

a switch for selectively outputting one of said first subtract signal, said second subtract signal and said adding signal in response to said n-bit comparison signal as output signals from said first to forth comparators.

4. The apparatus of claim 1, wherein said line correlation detecting means includes:

first and second low pass filters for low pass-filtering said first subtract signal and said second subtract signal, respectively, first and second absolute converters for determining absolute values of output signals from said corresponding low pass filters respectively, a first comparator for comparing an output signal from said first absolute converter and a first reference threshold voltage, a second comparator for comparing an output signal from said second absolute converter and the first reference threshold voltage, a third comparator for comparing the output signal from said first absolute converter and a second reference threshold voltage, a fourth comparator for comparing the output signal from said second absolute converter and the second reference threshold voltage, a fifth comparator for comparing the output signal from said first absolute converter and a third reference threshold voltage, and a sixth comparator for comparing the output signal from said second absolute converter and the third reference threshold voltage.

5. The apparatus of claim 4, wherein said selecting means includes:

a signal operator for combining said first subtract signal, said second subtract signal and said adding signal, and a switch for selectively outputting an adaptive signal of combined signals from said signal operator in response to said n-bit comparison signal as output signals from said first to sixth comparators.

* * * * *

UNITED STATES PATENT AND TRADEMARK OFFICE
CERTIFICATE OF CORRECTION

PATENT NO. : 5,367,342
DATED : November 22, 1994
INVENTOR(S) : Joon W. Bang

It is certified that error appears in the above-indentified patent and that said Letters Patent is hereby corrected as shown below:

Title page, item [54]

IN THE TITLE: and col. 1,

Please delete "SEPERATION" and insert --SEPARATION--.

Signed and Sealed this

Fourteenth Day of February, 1995

Attest:

BRUCE LEHMAN

Attesting Officer    Commissioner of Patents and Trademarks